United States Patent [19]

Hildebrandt et al.

[11] Patent Number: 4,473,789

[45] Date of Patent: Sep. 25, 1984

[54] MOTOR STARTING SWITCH WITH DUAL LOAD DISCONNECT

[75] Inventors: Eugene F. Hildebrandt; Thomas V. Ottersbach, both of St. Louis County, Mo.

[73] Assignee: Emerson Electric Co., St. Louis, Mo.

[21] Appl. No.: 938,457

[22] Filed: Aug. 31, 1978

[51] Int. Cl.³ .................. H02P 1/42; H01H 35/10; H02K 11/00
[52] U.S. Cl. ................... 318/793; 200/80 R; 310/68 E
[58] Field of Search ............... 318/782, 785, 793; 200/80 R; 310/68 E

[56] References Cited

U.S. PATENT DOCUMENTS 4,034,173 7/1977 Crow et al. ............... 200/80 R
4,160,885 7/1979 Ellicott et al. ............ 200/1 R Primary Examiner—J. R. Scott
Attorney, Agent, or Firm—Polster, Polster & Lucchesi

[57] ABSTRACT

A motor starting switch including a pair of auxiliary switches operable in response to the stopping of the drive motor of an electrical appliance or the like for disconnecting both sides of an electrical load in the appliance (e.g., for disconnecting a heating element) from the input power lines thereby to reduce shock and fire hazards of the appliance due to a short circuit of the load when the appliance is turned off, and for automatically connecting the load to the input lines of the appliance in response to start up of the motor.

16 Claims, 8 Drawing Figures

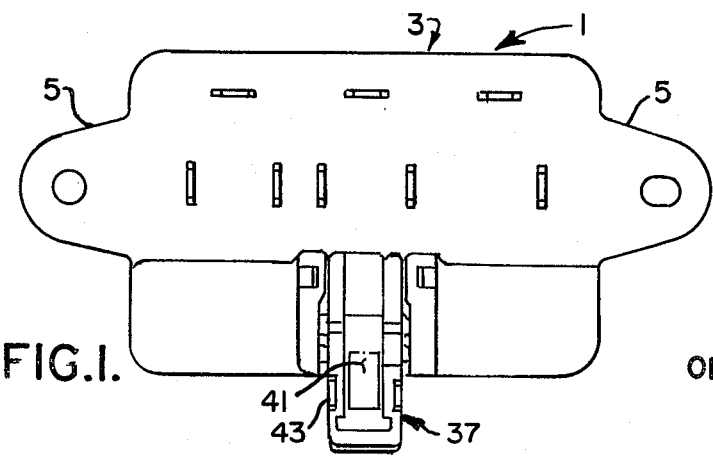
FIG.1.
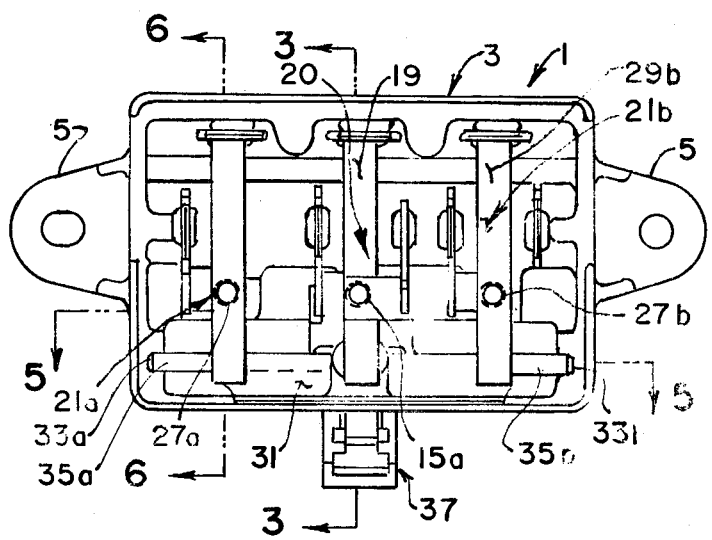
FIG.2.
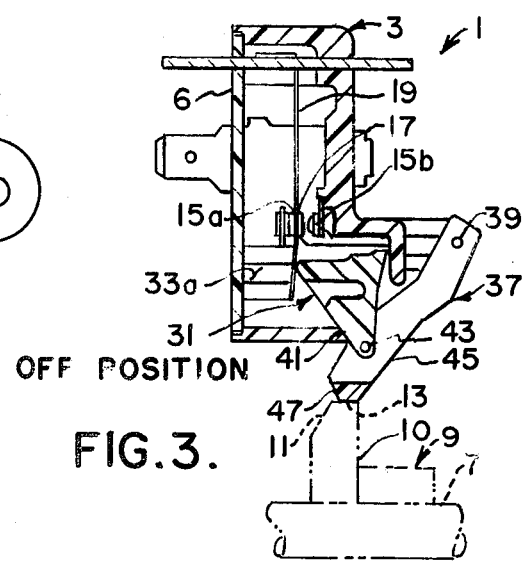
FIG.3. OFF POSITION
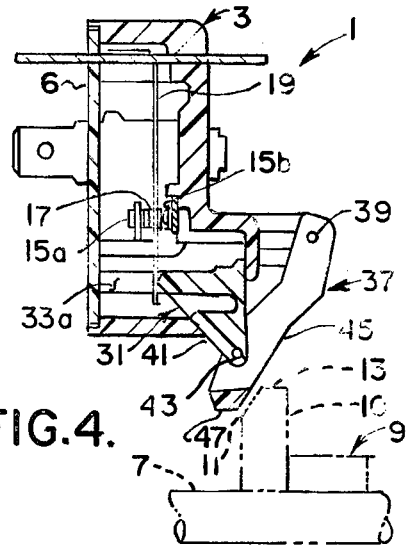
FIG.4. RUN POSITION
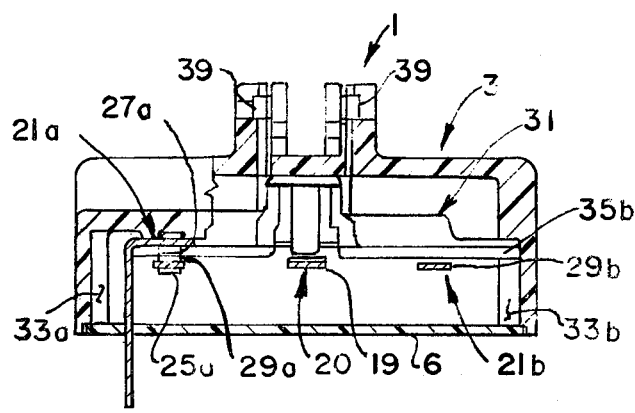
FIG.5.
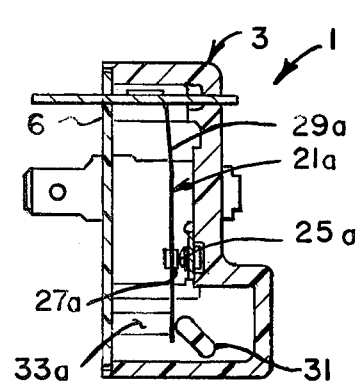
FIG.6.

OFF POSITION

RUN POSITION

MOTOR STARTING SWITCH WITH DUAL LOAD DISCONNECT

BACKGROUND OF THE INVENTION

This invention relates to a safety switch for disconnecting both sides of an electrical load in an electrical appliance from the power lines of the appliance thereby to reduce both shock and fire hazards when the appliance is turned off in the event of a short circuit of the load. More specifically, this switch is a combination motor starting switch and load disconnect switch operable by a centrifugal actuator which is typically included in the appliance drive motor.

As is conventional, the wiring system in a house or other building is such that at any outlet, one of the outlet leads is connected directly to the power line coming into the house and the other lead is connected to an electrically grounded return line. Switches for appliances or the like typically operate by making or breaking either the power input lead or the ground lead. In connecting most appliances to a home wiring system, it is difficult to determine which lead is the power input lead and which is the return lead, and many appliances it will operate satisfactorily no matter how the appliance is wired to the input and return leads. In certain instances with the on-off switch of an appliance (for example, the timing switch of an electric clothes dryer or the like) making or breaking the grounded return lead of the appliance, a mechanical or electrical failure of the load could short circuit the load to ground thus creating a shock or fire hazard in the appliance even though the appliance is turned off. This danger is especially apparent in such electrical appliances as electric clothes dryers in which the breakdown of the insulator supporting the heating element, or the breakage or sagging of the heating element wires, could result in a short circuit of the heating element to ground. Further, in such appliances as electric clothes dryers powered by 230 volt current, it will be appreciated that both power input leads are "hot" so that a failure of the heating element could cause a 115 v. short to ground through the element. Heretofore, motor starting switches for the drive motor of the appliance were known which not only effected energization and deenergization of the starting winding of the drive motor upon start up and shut down of the motor, but also, certain of these motor starting switches disconnected one side or the other of an electrical load from one of the power lines of the appliance. However, since only one side of the load was disconnected from the load lines, in many instances the load would still be connected to the power input lead so that in the event of a failure of the load to ground, a short circuit of the load could occur.

Reference may be made to the co-assigned U.S. Pat. No. 4,034,173 which discloses a motor starting switch in the same general field as the switch of this invention and to the co-assigned U.S. patent application Ser. No. 938,455 filed Aug. 30, 1978, now U.S. Pat. No. 4,240,001.

SUMMARY OF THE INVENTION

Among the several objects and features of this invention may be noted the provision of a switch operable in response to the stopping of the drive motor of an appliance for disconnecting both sides of an electrical load from the input and return leads of the appliance thereby to reduce both shock and fire hazards of the appliance when the latter is off and for automatically reconnecting the load to the input and return lines of the appliance upon start up of the drive motor;

The provision of such a switch which is readily actuable by the centrifugal actuator of the drive motor of the appliance and which requires only a relatively low actuation force;

The provision of such a switch which positively opens and holds open its contacts for breaking connection to the load upon stopping of the drive motor; and The provision of such a switch which may be readily incorporated in the appliance, which is inexpensive to manufacture and to install, which is reliable in operation, and which is of rugged construction.

Briefly, a switch of this invention is intended for use in an appliance or the like for disconnecting both sides of a load in the appliance from the power input lines of the appliance thereby to reduce shock and fire hazards in the event the load inadvertantly becomes grounded while the appliance is off and for automatically connecting the load to the input lines upon start up of the appliance. The appliance has an actuator operably movable from an off position to a run position in response to start up of the appliance and is further movable from its run to its off position in response to stopping of the appliance. The switch comprises a switch housing, and a first and a second set of switch contacts for making electrical contact between both sides of the load and the input lines in response to the actuator moving from its off to its run position and for breaking electrical contact between the load and the input lines in response to movement of the actuator from its off position.

Other objects and features of this invention will be in part apparent and in part pointed out hereinafter.

BRIEF DESCRIPTION OF THE DRAWINGS

FIG. 1 is a back side elevational view of a switch of this invention illustrating the side of the switch adapted to face a centrifugal actuator when the switch is installed in an electric motor in its normally installed position;

FIG. 2 is front side elevational view of the switch with its cover plate removed;

FIG. 3 is a vertical cross sectional view taken along line 3—3 of FIG. 2 illustrating an actuator member of a centrifugal actuator in phantom and showing the contacts of the switch and the actuator member in their respective relative positions when the motor is off;

FIG. 4 is a view similar to FIG. 3 showing the switch contacts and the actuator member in their respective positions when the motor is running at a predetermined operating speed;

FIG. 5 is a horizontal cross sectional view of the switch taken along line 5—5 of FIG. 2;

FIG. 6 is a vertical cross sectional view of the switch taken along line 6—6 of FIG. 2;

DESCRIPTION OF A PREFERRED EMBODIMENT

Figure 7:
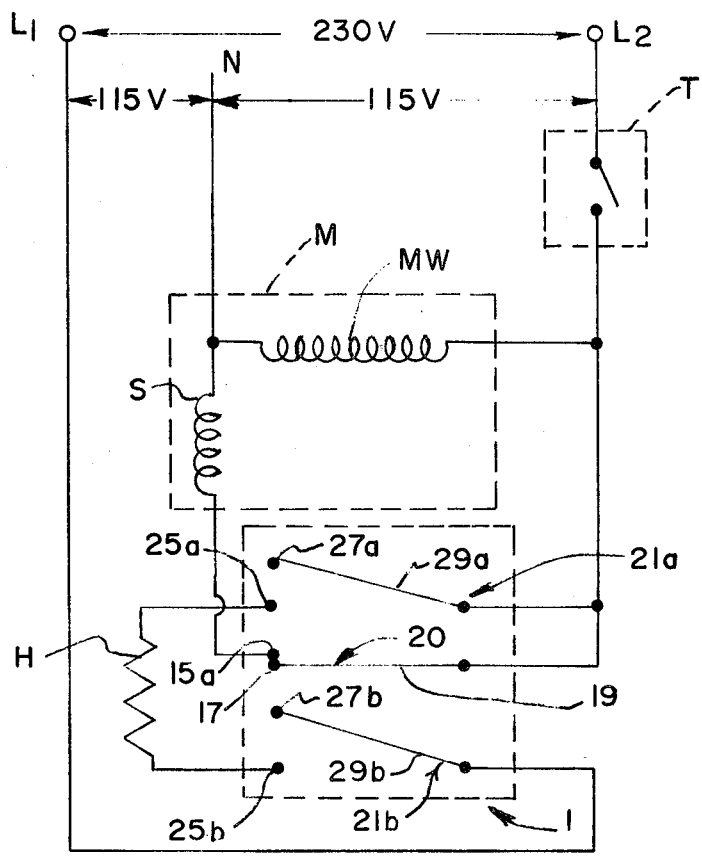
FIG. 7 is a schematic diagram of the switch of this invention included in the wiring system of an electric clothes dryer appliance, the switch being illustrated in its off position with both sides of the heating element of the dryer disconnected from the appliance both input lines.

Referring now to the drawings, a combination motor starting/load disconnect switch of this invention is indicated in its entirety at reference character 1 and it is shown to comprise a housing 3 of molded, synthetic resin material, such as bakelite, which is a good electrical insulator. Housing 3 has a pair of mounting ears 5 for rigidly mounting the starting switch on the end shield or other part of an electric motor. The housing is provided with a removable front cover 6 for enclosing sets of electrical contacts in the switch housing.

Switch 1 is intended to be mounted in relatively close proximity to a rotor shaft 7 (see FIGS. 3 and 4) of the motor. As is typical, a centrifugal actuator, as generally indicated at 9, is mounted on shaft 7 for rotation therewith. Generally, this actuator may be similar to any one of a number of known centrifugal actuators, such as the actuator shown in the co-assigned U.S. Pat. No. 3,609,421. The centrifugal actuator is mounted on shaft 7 for rotation therewith and has an actuator member 10 movable in axial direction along the shaft from an off position (as shown in FIG. 3) when the motor is stopped (or when it is operating below a specified speed) and a run position (as shown in FIG. 4) when the motor is operated at or above a predetermined speed. Actuator member 10 as shown to have a conical actuator face 11 facing toward its off position and an outer cylindric face 13 generally parallel to the axis of the rotor shaft and contiguous to the outer edge of the conical face.

Figure 8:
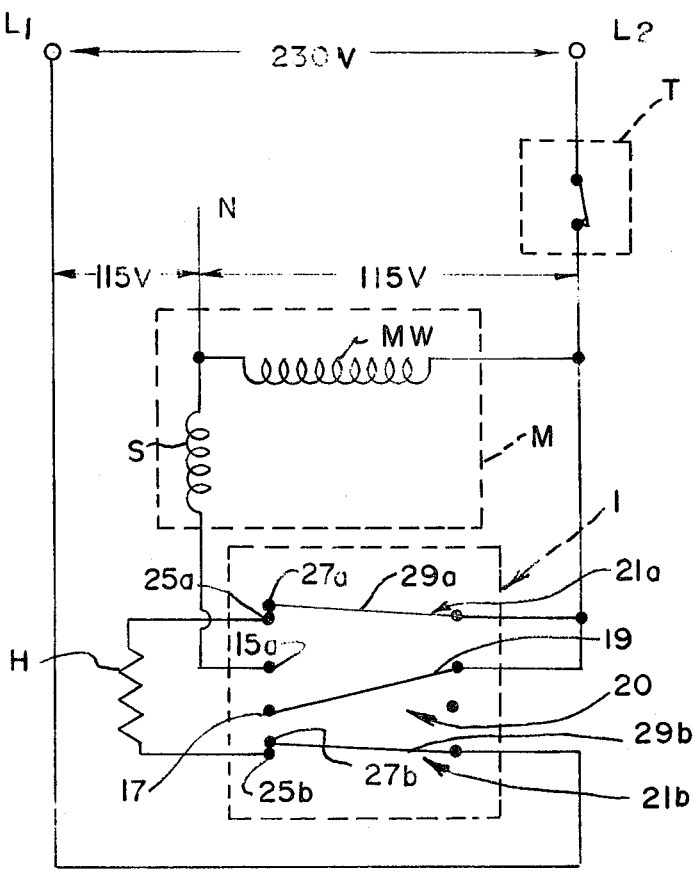
FIG. 8 is a view similar to FIG. 7 illustrating the switch in its run position with both sides of the heating element connected to the input lines.

As best shown in FIGS. 2-4, a plurality of sets of electrical contacts are provided in switch housing 3. In particular, the starting switch illustrated in the drawings has a center contact set including a pair of spaced, fixed contacts 15a and 15b and a movable contact 17 mounted on a resilient, flexible switch arm 19 of spring-like electrically conductive metal (e.g., beryllium copper or the like) cantilever supported by switch housing 3 and being flexibly movable between the fixed contacts so as to constitute a single pole, double throw switch, as is generally indicated at 20. For example, fixed contact 15a may be connected to the starting winding S of a drive motor M of an electric appliance, such as an electric clothes dryer shown schematically in FIGS. 7 and 8. Switch arm 19 is shown to be connected to a source of power (e.g., to the load or input line of the appliance) so that upon start up of the motor, contacts 15a and 17 effect energization of the starting winding. As best shown in FIGS. 2, 7 and 8, switch 1 further includes a pair of single pole, single throw switches, as generally indicated at 21a and 21b. Each of these switches has a respective fixed contact 25a, 25b and a respective movable contact 27a, 27b carried on a respective resilient flexible switch arm 29a, 29b cantilever supported from the switch housing for flexible movement toward and away from its fixed contact for making and breaking a circuit. Switch arms 29a, 29b are similar in construction to the above-described switch arm 19. In FIGS. 7 and 8, switches 21a and 21b are shown to connect a load in the appliance, such as heating element H, to the load lines (i.e., to the power input and return lines) L1, L2 of the appliance when closed and to disconnect both sides of the load from the load lines when open. Switch arms 19, 29a and 29b constitute spring means for biasing their respective movable contacts toward a normal or unflexed position (as shown in FIGS. 3 and 6) in which movable contact 17 is in firm engagement with fixed contact 15b and in which movable contacts 27a and 27b are in engagement with their respective fixed contacts 25a and 25b.

The movable contacts and switch arms of switches 20, 21a and 21b are movable relative to their respective fixed contacts between a first or off position (as shown in FIGS. 3 and 7) and second or run position (as shown in FIGS. 4, 6 and 8). In the off position of the switch (i.e., when centrifugal actuator 9 is in its off position), contacts 15a and 17 are in electrical contact with one another (see FIG. 7) so as to energize starting windings of motor M upon start up of the motor and the contacts of switches 21a, 21b are open (also see FIG. 7) so as to disconnect both sides of heating element H from both load or input lines L1 and L2. Thus, in the event of a failure of the heating element, such as a broken or sagging heating wire or a failure of the insulators supporting the heating element, a short to ground of the power input lead via the broken heating element is prevented when the appliance is off thus reducing the shock and fire hazards of the appliance. In the run position of switch 1 (shown in FIGS. 4 and 8), contacts 15a and 17 of switch 20 are open thereby to deenergize start winding S, and the contacts of switches 21a and 21b are closed (see FIGS. 6 and 8) thereby to connect by the load (i.e., heater H) to the appliance input lines.

A slider member, as generally indicated at 31, is slidably mounted in tracks 33a, 33b provided in housing 3 for sliding along a line of action generally parallel to the longitudinal axis of rotor shaft 7 when motor starting switch 1 is mounted on a motor in its normally installed position. As shown, slider 33 is enlongate member preferably molded of a suitable synthetic resin material. It extends from one side of housing 3 to the other and has cylindrical lugs 35a, 35b at each end thereof for reception in respective tracks 33a, 33b. A lever 37 also of synthetic resin material is pivotally secured to housing 3, as indicated at 39, for swinging in a plane including the longitudinal axis of shaft 7 and the line of movement of slider 31. Slider 31 has an integral portion 41 extending downwardly from the rear portion thereof. Portion 41 is shown to be pivotally connected to lever 37, as indicated at 43, at a location intermediate pivot connection 39 and the point on the lever it is engaged by actuator member 10. This pivotal connection 43 is also referred to as a knee. As best shown in FIG. 1, lever 37 is bifurcated with a slot therein for reception of portion 41 of slider 31. The lever has an inclined surface 45 engageable by conical surface 11 of actuator member 10 as the latter moves from its run position toward its off position for swinging the lever upwardly or counterclockwise (as shown in FIGS. 3 and 4) so as to in turn effect sliding movement of slider 31 in tracks 33a, 33b from rear to front of housing 3 and to effect rotation of the slider relative to the housing about its cylindric lugs 35a, 35b which fit into the tracks. This sliding movement of the slider causes it to engage the outer ends of switch arms 19, 29a and 29b and to flex or bend them so as to reset or close switch 20 (i.e., to bring movable contact 17 into electrical contact with fixed contact 15a) so as to effect energization of the starting winding of the motor upon start up of the motor and to open switches 21a and 21b (see FIG. 7) thereby to positively disconnect both sides of heater H (i.e., the load) from the load lines.

Upon continued movement of actuator member 10 toward its off position, inclined surface 45 of lever 37 will ride up conical face 11 of the actuator member so as to effect the above-mentioned swinging movement of the lever. Upon the top of the conical surface engaging the bottom edge of the inclined face of the lever and upon continued axial movement of actuator member 10 toward its off position, the lever will ride up over the intersection between conical face 11 and cylindric face 13 of the actuator member so that a bottom surface 47 of the lever rides on the cylindric surface of the actuator member. Upon the bottom surface of the lever engaging the cylindric surface of the actuator member, no further swinging of the lever occurs (even though actuator member 10 may continue its axial movement) and the relative positions of the lever and the slide are maintained fixed so as to in turn hold switch arms 19, 29a and 29b in their flexed positions (as shown in FIG. 3). It will be appreciated that with the flexible resilient switch arms 19, 29a and 29b so flexed, they resiliently bear against the slider and thus constitute means for biasing slider 31 rearwardly in housing 3 toward the its position in the housing it occupies when the actuator member is in its run position. These switch arms further bias lever 37 toward the actuator member 10 and hold it in engagement therewith. Thus, upon movement of actuator member 10 from its off toward its run position, bottom surface 47 of lever 37 will first move clear of cylindric surface 13 of the actuator member, then inclined surface 45 of the lever will bear on conical face 11 of the actuator member, and finally, upon further axial movement of the actuator member toward its run position, the actuator member will move clear of the lever altogether. This, of course, allows switch arms 19, 29a and 29b to return to their unflexed positions (see FIGS. 4–6) and causes the opening of contacts 15a and 17 and the closing of contacts 15b and 17 of switch 20, and the closing of switches 21a and 21b. With the above-noted contacts and switches closed, the biasing force of switch arms 19, 21a and 29b on the slider is relaxed thus ensuring that the full force of the flexible switch arms is utilized to keep their respective movable contacts in firm electrical contact with their respective fixed contacts.

It will be noted that lever 37 and slider 31 are preferably moved through their entire path of motion by actuator member 10 during only a portion of the length of axial travel (or stroke) of the actuator member. More specifically, movement of the lever and slider occurs only when inclined face 45 of the lever is in engagement with conical face 11 of the actuator member and when the latter is moving between its run and off positions. It is a particular advantage of switch 1 that it does not matter during which portion of the stroke of the actuator member that the inclined face 45 of lever 37 rides on conical face 11 of the actuator member so long as the lever is moved through its full swing. Accordingly, precise positioning and adjustment of switch 1 on the motor with respect to centrifugal actuator 9 is not required and switch 1 can therefore accommodate relatively large amounts of rotor shaft end play with consequent change of the position of the centrifugal actuator with respect to the switch without adversely affecting operation of the switch.

It will also be noted that slider 31 and lever 37 constitute an actuating linkage arrangement operable by the centrifugal actuator. Further, this actuating linkage is mounted on and carried by switch 1 so that the linkage and the switch may be installed on a motor in a single operation during manufacture of the motor thus eliminating the necessity of having to install a separate linkage after installation of the switch. Also, slider 31 and its "knee action" motion efficiently moves switch arms 19 and 29 in an axial direction substantially parallel to the axial direction of the movement of actuator member 10 on rotor shaft 7. Because of the relative locations of slider lugs 35a, 35b and of pivots 39 and 43 the axial force required of the centrifugal actuator to effect movement of the switch arms is quite low in comparison with other known actuator linkages. More specifically, lever 37 and slider 31 constitute a toggle linkage. As actuator member 10 moves from its run position to its off position and engages lever 37, the lever swings upwardly (i.e., clockwise as viewed in FIGS. 2 and 3) thus moving pivot point 43 (also referred to as the knee of the toggle linkage) closer to an imaginary line between lugs 35a, 35b and pivot point 39. As the center or knee pivot moves closer to the above-noted imaginary line, the geometry of the linkage changes and a force greater than the force exerted on the knee of the linkage is exerted on the switch arms. Accordingly, switch 1 is easier to actuate and thus effectively avoids many of the "stuck actuator" malfunctions experienced by other prior art motor starting switches.

A spring (not shown) may be provided within housing 3 so as to cooperate with the above-mentioned means (i.e., switch arms 19 and 29) for biasing the slider and lever 37 toward their respective positions when actuator member 10 is in its run position.

Referring now to FIGS. 7 and 8 switch 1 is diagramatically shown connected in a circuit for an electric appliance, such as an electric clothes dryer. The circuit includes a timer switch T which opens and closes one of the load or input lines (e.g., line L2) of the appliance to start and stop the appliance. As shown, timing switch T controls energization of the main winding MW of motor M and supplies current to switches 20 and 21a of switch 1. With the appliance turned off, timer switch T and switch 1 are in their respective off positions, as shown in FIG. 7 and motor M is stopped. Switch 20 is shown to be closed, that is, its movable contact 17 on switch arm 19 is in electrical contact with fixed contact 15a so as to energize starting winding S of the motor upon closing of the timing switch. Upon the motor accelerating up to a predetermined operating speed, centrifugal actuator 9 (not shown in FIGS. 7 and 8) automatically opens switch 20 in the manner heretofore described so as to deenergize starting winding S. Furthermore, the centrifugal actuator automatically closes switches 21a and 21b so as to connect both sides of heating element H (i.e., the load) to load lines L1 and L2 of the appliance. Thus, the heating element will remain energized so long as the motor continues to operate. Upon timer switch T opening and breaking load line L2, motor M is deenergized and begins to stop. Upon motor M slowing below a predetermined speed (or upon its stopping), centrifugal actuator 9 moves from its run to its off position thus resets switch 20 (i.e., makes contact between contacts 15a and 17 of switch 20) and breaks electrical contact between contacts 25a, 27a and between contacts 25b, 27b of switches 21a and 21b respectively, thereby removing both sides of heater H from the power input lines of the appliance when the latter is off. As mentioned above, the fact that both sides of the load are disconnected from the input lines of the appliance when the appliance is off reduces the shock and fire hazard of the appliance due to a short circuit of the load to ground.

While switch 1 has been disclosed for use with an electric clothes dryer, it will be understood that it could be readily used with any appliance or electrical device or with any electric motor when it is desired that both sides of a load be disconnected from the load lines (or where two or more loads are to be disconnected from the load lines) upon shut down of an electric motor and be reconnected to the load lines upon start up of the motor. Also, other actuators other than a centrifugal actuator may be used to operate switch 1.

In view of the above, it will be seen that the several objects of the invention are achieved and other advantageous results attained.

As various changes could be made in the above construction without departing from the scope of the invention, it is intended that all matter contained in the above description and shown in the accompanying drawings shall be interpreted as illustrative and not in a limiting sense.

What is claimed is:

1. In an appliance having an electrical load and a motor, said load having a first side and a second side, switch means for disconnecting both sides of said load from the power input lines of the appliance thereby to reduce shock and fire hazards in the event the load inadvertently becomes grounded while said appliance motor is off and for automatically connecting both sides of the load to the input lines upon start up of the appliance motor, said appliance motor having an actuator operably movable from an off position to a run position in response to start up of the appliance motor and being further movable from its run to its off position in response to stopping of said appliance motor, said switch means having a first and a second set of switch contacts for making respective electrical contact between said first and second sides of said load and said input lines in response to said actuator moving from its off to its run position and for breaking electrical contact between first and second sides of said load and said input lines in response to movement of said actuator from its off position.

2. In an appliance having an electric motor, an electrical load, the latter having a first side and a second side, and switch means for disconnecting both sides of a load in the appliance from the power input lines of the appliance motor upon shut down of the appliance motor thereby to reduce shock and fire hazard in the event the load inadvertently becomes grounded while said appliance is off and for automatically connecting said load to said input lines upon start up of the appliance, said appliance motor having a starting winding and a centrifugal actuator movable from an off position to a run position in response to said motor being started, said centrifugal actuator further being movable from its run position to its off position in response to slowing of the motor, a linkage operatively interconnecting said centrifugal actuator and said switch means, the latter comprising a switch housing adapted to be mounted with respect to said motor for actuation of said switch means by said centrifugal actuator, a first set of switch contacts within said housing for deenergizing said starting winding in response to movement of actuator from its off to its run position and for resetting said first set of contacts so as to effect the energization of said starting winding upon start up of the motor in response to movement of said centrifugal actuator from its run to its off position, and second and third sets of switch contacts for making electrical contact between a respective side of said load and a respective power input line in response to said centrifugal actuator moving from its off to its run position and for breaking electrical contact between both sides of said load and said power input lines in response to movement of said centrifugal actuator from its off position.

3. In an appliance as set forth in claim 2 wherein each of said sets of switch contacts includes a fixed contact, a movable contact, and a resilient switch arm cantilevered with respect to said housing, each said switch arm being resiliently and flexibly movable relative to said housing between a flexed position and an unflexed position, said switch further comprising a sliding member slidably movable relative to said housing between a first position in which it is clear of said switch arms thus enabling said switch array to assume their respective unflexed positions, and a second position in which said sliding member is in engagement with said switch arms and in which the latter are resiliently flexed.

4. In an appliance as set forth in claim 3 wherein said sliding member has an elongate portion extending generally from side to side of said housing and being engagable with said switch arms of said second and third sets of switch contacts.

5. In an appliance as set forth in claim 3 wherein said slider member is slidably movable in one direction within said housing in response to said centrifugal actuator moving from its run to its off position for flexing said switch arms thereby to close said first set of contacts and to open said second and third set of contacts, said slider being slidably movable in opposite direction within said housing in response to said centrifugal actuator moving from its run to its off position for unflexing said switch arms thereby to open said first set of switch contacts so as to deenergize said starting winding of said motor and to close said second and third sets of said contacts.

6. An electrical switch comprising:
(a) a housing having wall means defining a chamber in said housing, said wall means including at least a pair of generally opposite sidewalls, and another wall extending between said side walls;
(b) an opening in said housing and extending through one of said sidewalls;
(c) a plurality of switch means in said chamber, each of said switch means of said switch means plurality including a pair of switch members at least one of which is movable, said at least one switch member being operable generally between a making position engaged with the other of said switch members and a breaking position disengaged therefrom, respectively;
(d) a plurality of switch means supporting terminals mounted with said housing so as to extend through said wall means with each of said terminals of said switch means supporting terminal plurality respectively including a supporting section within said chamber for supporting one of said at least one switch member and said other switch member, and an electrical connector section exteriorly of said chamber and disposed generally adjacent said wall means, one pair of said terminals of said switch means supporting terminal plurality extending through the other of said sidewalls with said supporting section of one of said terminals of said only one terminal pair supporting at least one of said at least one switch member and with said supporting section of the other of said terminals of said only one terminal pair supporting said other switch member, and all of the others of said terminals of said switch means supporting terminal plurality extending through said another wall; and (e) means movable in said chamber for engaging and actuating each of said at least one switch member to effect the operation thereof from one of the making and breaking positions toward the other of the making and breaking positions thereof, respectively, said engaging and actuating means including means in said chamber for camming at least two of said at least one switch members from the one of the making and breaking positions toward the other of the making and breaking positions thereof prior to the operation of the other of said switch members from the one of the making and breaking positions to the other of the making and breaking positions thereof, respectively, and means integral with at least a part of said engaging and actuating means and extending through said opening exteriorly of said chamber for receiving a force to effect the movement of said engaging and actuating means so as to operate said each of said at least one switch members.

7. An electrical switch comprising:
(a) a housing having a plurality of wall means defining a chamber within said housing;
(b) a plurality of switch means movable in said chamber for operation between circuit controlling positions, respectively;
(c) means reciprocally movable with respect to said housing for engaging and actuating each of said switch means of said switch means plurality including a pair of means movable within said chamber for camming engagement with a pair of said switch means of said switch means plurality so as to effect the operation of said switch means pair from one of the circuit controlling positions toward another of the circuit controlling positions thereof, respectively, means movable within said chamber for abutment with another switch means of said switch means plurality so as to effect the operation of said another switch means from one of the circuit controlling positions toward another of the circuit controlling positions thereof, and means on said engaging and actuating means for receiving a force and reciprocally movable in response to the force to effect the movement of said engaging and actuating means so as to operate said each switch means of said switch means plurality; and
(d) said each switch means of said switch means plurality including a pair of switch members with at least one of said switch members being movable from one of the one and another circuit controlling positions in engagement with the other of said switch members toward the other of the one and another circuit controlling positions disengaged from said other switch member, respectively, said at least one switch member of said switch means pair being respectively operated by said camming engagement means pair and said at least one switch member of said another switch means being operated by said abutment means.

8. An electrical switch as set forth in claim 7 further comprising a plurality of terminals mounted to said housing and respectively supporting within said chamber one of said at least one switch members and said other switch members, only two of said terminals of said terminal plurality extending through one of said wall means of said wall means plurality, and the others of said terminals of said terminal plurality extending through another of said wall means of said wall means plurality.

9. An electrical switch comprising:
(a) a housing having a plurality of wall means defining a switch means accommodating chamber within said housing;
(b) a plurality of switch means movable in said chamber for operation between circuit controlling positions, respectively;
(c) means operable generally for engaging and actuating each of said switch means of said switch means plurality to effect the operation thereof from one of the circuit controlling positions toward the other of the circuit controlling positions, respectively, said engaging and camming means including a pair of means for camming engagement with each other and respectively reciprocally movable in said housing between a pair of displaced positions, one of said camming engagement means being operatively associated with said each switch means of said switch means plurality, and the other of said camming engagement means including means for receiving a force, said receiving means being reciprocally movable in response to the force thereon so as to move said other camming means from one of the displaced positions toward the other thereof and cam said one camming engagement means from one of its displaced positions toward the other thereof to effect the operation of said each switch means of said switch means plurality;
(d) said each switch means of said switch means plurality including a pair of switch members with at least one of said switch members being movable from one of the one and another circuit controlling positions in engagement with the other of said switch members toward the other of of the one and another circuit controlling positions disengaged from said other switch member, respectively, said one camming engagement means being operatively associated with each of said at least one switch members to effect the operation thereof; and
(e) a plurality of terminals associated with said housing and respectively supporting within said chamber one of said at least one switch members and said other switch members of said each switch means, two of said terminals of said terminal plurality extending through one of said wall means of said wall means plurality, and the others of said terminals of said terminal plurality extending through another of said wall means of said wall means plurality generally continguous with said one wall means.

10. An electrical switch as set forth in claim 9 wherein at least one of said switch means of said switch means plurality includes a resilient portion for opposing the movement of said one camming engagement means from one of the one and other displaced positions toward the other of the one and other displaced positions thereof.

11. An electrical switch as set forth in claim 9 wherein at least said two terminals of said terminal plurality respectively include a supporting section within said chamber, a pair of said at least one switch members being associated with said supporting section of one of said two terminals of said terminal plurality, and one of said other switch members being associated with said supporting section of the other of said two terminals of said terminal plurality.

12. A method of operating an electrical switch having a plurality of switch means movable therein between circuit controlling positions with at least one of the switch means of the switch means plurality being resilient, cam means reciprocally movable in the electrical switch between at least a pair of displaced position, and a cam follower associated with the cam means and each of the switch means of the switch means plurality, the method comprising the steps of:
  (a) controlling the application of a force on the cam means and reciprocally moving the cam means from one of its displaced positions toward the other of its displaced positions;
  (b) driving the cam follower in following engagement with the cam means upon the reciprocal movement thereof toward its other displaced position and effecting the movement of the each switch means of the switch means plurality toward one of their respective circuit controlling positions; and
  (c) utilizing the resiliency of the at least one switch means to urge the cam follower toward following engagement with the cam means and returning the cam means toward its one displaced position.

13. The method as set forth in claim 12 comprising the additional step of effecting the movement of the switch means plurality from the one respective circuit controlling positions thereof toward another of their respective circuit controlling positions upon the return of the cam means toward its one displaced position in response to the resiliency of the at least one switch means during the utilizing and returning step.

14. A method of operating an electrical switch having a plurality of switch means movable therein between circuit controlling positions with at least one of the switch means of the switch means plurality being resilient, cam means shiftable in the electric switch between generally opposite displaced positions, and a cam follower associated with the cam means and each of the switch means of the switch means plurality, the method comprising the steps of:
  (a) controlling the application of a force on the cam means and shifting the cam means from one of its opposite displaced positions toward the other of its opposite displaced positions;
  (b) driving the cam follower in following engagement with the cam means and effecting the movement of the each switch means of the switch means plurality toward one of the respective circuit controlling positions thereof; and
  (c) utilizing the resiliency of the at least one switch means to urge the cam follower against the cam means and returning the cam means toward its one opposite displaced position against the force applied to the cam means.

15. The method as set forth in claim 14 wherein the utilizing and returning step comprises effecting the movement of the each switch means of the switch means plurality from the one respective circuit controlling positions toward another of their respective circuit controlling positions upon the return of the cam means toward its one opposite displaced position with the resiliency of the at least one switch means acting on the cam follower so as to at least assist in the return of the cam means.

16. An electrical switch comprising:
  a housing including a plurality of wall means defining a switch means accommodating chamber within said housing;
  a plurality of switch means operable in said chamber for movement between selected positions, each of said switch means of said switch means plurality including a pair of switch members with at least one of said switch members being movable with respect to the other of said switch members between the selected positions;
  means for engaging and actuating said at least one switch members between the selected positions, respectively; add
  a plurality of terminals associated with said housing and respectively supporting within said chamber one of said at least one switch members and said other switch members, two of said terminals of said terminal plurality extending through one of said wall means of said wall means plurality and the others of said terminals of said terminal plurality extending through at least another wall means of said wall means plurality, at least said two terminals including a supporting section within said chamber, and said supporting section of one of said two terminal being associated in supporting engagement with two of said at least one switch members and said supporting section of the other of said two terminals being associated in supporting engagement with one of said other switch members.

* * * * *

UNITED STATES PATENT AND TRADEMARK OFFICE
CERTIFICATE OF CORRECTION

PATENT NO. : 4,473,789
DATED : September 25, 1984
INVENTOR(S) : Eugene T. Hildebrandt and Thomas V. Ottersbach It is certified that error appears in the above—identified patent and that said Letters Patent is hereby corrected as shown below:

Column 10, line 2, "only two" should be "two"

Column 11, line 11, "position" should be "positions"

Column 12, line 32, "add" should be "and"

Signed and Sealed this

Fifth Day of March 1985

[SEAL]

Attest:

DONALD J. QUIGG

Attesting Officer — Acting Commissioner of Patents and Trademarks